(12) United States Patent
Chauvel et al.

(10) Patent No.: US 7,146,613 B2
(45) Date of Patent: Dec. 5, 2006

(54) JAVA DSP ACCELERATION BY BYTE-CODE OPTIMIZATION

(75) Inventors: Gerard Chauvel, Antibes (FR); Dominique D'Inverno, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 657 days.

(21) Appl. No.: 10/157,530

(22) Filed: May 29, 2002

(65) Prior Publication Data

US 2003/0101208 A1 May 29, 2003

(30) Foreign Application Priority Data

Nov. 15, 2001 (EP) .................................. 01402955

(51) Int. Cl.
- *G06F 9/455* (2006.01)
- *G06F 9/45* (2006.01)
- *G06F 12/00* (2006.01)

(52) U.S. Cl. .......................... 718/1; 717/144; 717/148; 717/150; 717/153; 717/158; 711/6

(58) Field of Classification Search ............ 718/1–108; 712/227; 455/11.1; 707/1; 717/126–134, 717/144–158; 719/310; 711/6
See application file for complete search history.

(56) References Cited

U.S. PATENT DOCUMENTS

| 4,713,749 A | | 12/1987 | Magar et al. | |
|---|---|---|---|---|
| 5,740,441 A | * | 4/1998 | Yellin et al. | 717/134 |
| 5,748,964 A | * | 5/1998 | Gosling | 717/126 |
| 5,983,073 A | * | 11/1999 | Ditzik | 455/11.1 |
| 5,995,754 A | * | 11/1999 | Holzle et al. | 717/158 |
| 6,438,573 B1 | * | 8/2002 | Nilsen | 718/100 |
| 6,633,862 B1 | * | 10/2003 | Thompson | 707/1 |
| 6,865,734 B1 | * | 3/2005 | Holzle et al. | 717/153 |
| 6,922,828 B1 | * | 7/2005 | Alexander et al. | 717/144 |
| 6,957,428 B1 | * | 10/2005 | Sokolov et al. | 718/1 |
| 2002/0046298 A1 | * | 4/2002 | Bak et al. | 709/310 |
| 2002/0129225 A1 | * | 9/2002 | Lindwer | 712/227 |
| 2003/0061254 A1 | * | 3/2003 | Lindwer et al. | 709/1 |
| 2003/0070161 A1 | * | 4/2003 | Wong et al. | 717/148 |
| 2004/0015916 A1 | * | 1/2004 | Click et al. | 717/150 |

(Continued)

FOREIGN PATENT DOCUMENTS

WO  WO 98 59292 A  12/1998

(Continued)

OTHER PUBLICATIONS

Lambright, "JAVA Bytecode Optimizations", IEEE, 1997, pp. 206-210.*

(Continued)

*Primary Examiner*—Meng-Ai An
*Assistant Examiner*—Jennifer N. To
(74) *Attorney, Agent, or Firm*—Robert D. Marshall, Jr.; W. James Brady; Frederick J. Telecky, Jr.

(57) ABSTRACT

A digital system and method of operation is which the digital system has a processor with a virtual machine environment for interpretively executing instructions. First, a sequence of instructions is received (404) for execution by the virtual machine. The sequence of instructions is examined (408–414) to determine if a certain type of iterative sequence is present. If the certain type of iterative sequence is present, the iterative sequence is replaced (412) with a proprietary code sequence. After the modifications are complete, the modified sequence is executed in a manner that a portion of the sequence of instructions is executed in an interpretive manner (418); and the proprietary code sequences are executed directly by acceleration circuitry (420).

10 Claims, 4 Drawing Sheets

U.S. PATENT DOCUMENTS

2004/0015917 A1* 1/2004 Click et al. .................. 717/150

FOREIGN PATENT DOCUMENTS

| WO | WO 01 13223 A | 2/2001 |
|---|---|---|
| WO | WO 01 55844 A | 8/2001 |

OTHER PUBLICATIONS

Piumarta et al., "Optimizing Direct Threaded Code by Selective Inlining", ACM, 1998, pp. 291-300.*

Aletan, "An Overview of RISC Architecture", ACM, 1992, pp. 11-20.*

Levy, Markus; *Java To Go: Parts 1-3*, Microprocessor, vol. 15, Archive 2 (www.MPRonline.com); Feb. and Mar. 2001,.

Levy, Markus; *Java To Go: Part 4 and The Finale*, Microprocessor, vol. 15, Archive 6 (www.MPRonline.com); Jun. 2001,.

Hsieh, Cheng-Hsueh, et al.; *Optimizing NET Compilers for Improved Java Performance*, IEEE Computer, Jun. 1997, pp. 67-75.

Cramer, Timothy, et al.; *Compiling Java Just in Time*, IEEE Micro, May/Juen. 1997, pp. 36-43.

Silberman, G.M., et al.; An Architectural Framework for Supporting Heterogeneous Instruction-Set Architectures, Computer, IEEE Computer Society, Long Beach, CA, US, vol. 26, No. 6, Jun. 1, 1993, pp. 39-56.

* cited by examiner

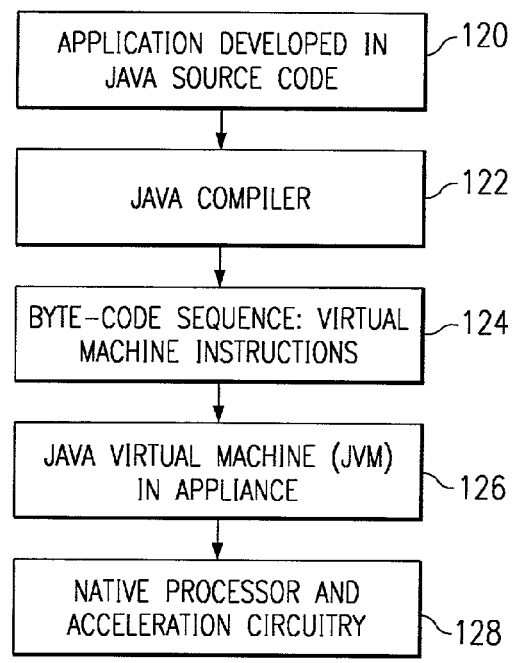
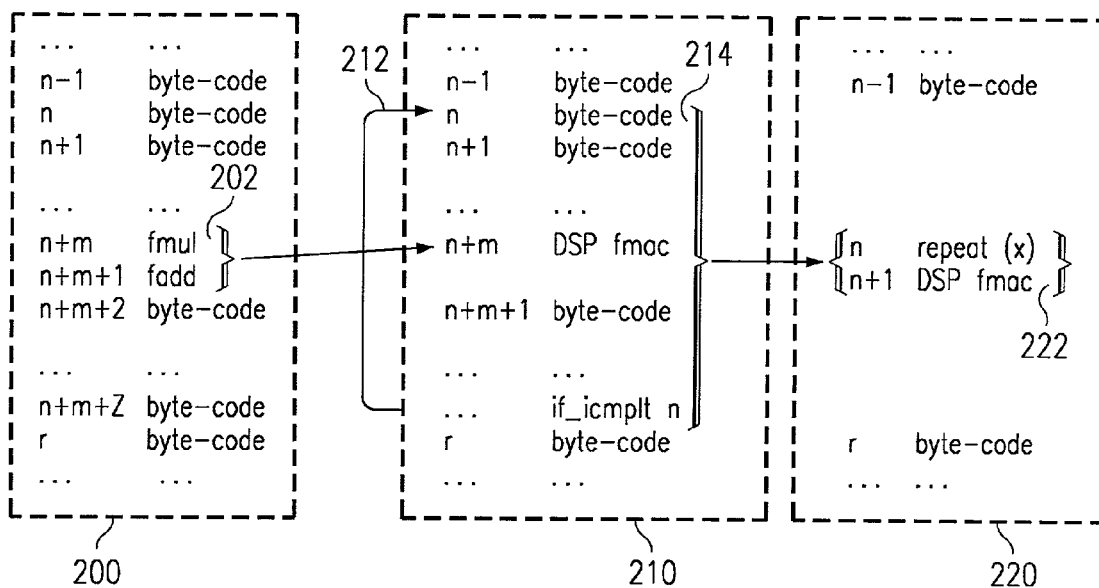

JAVA DSP ACCELERATION BY BYTE-CODE OPTIMIZATION

This application claims priority to European Application Serial No. 01402955.7 filed Nov. 15, 2001.

FIELD OF THE INVENTION

The present invention relates to a data processing apparatus, system and method for executing interpretative instruction sequences on one or more target processors. In particular, but not exclusively, the instruction sequences are executed under a virtual machine, for example a JAVA virtual machine, for the one or more target processors.

BACKGROUND

It is becoming more and more common for a variety of appliances and electronic goods to include processing devices embedded within them to provide a high level of functionality for the appliance. For example, embedded processing devices may be found in such disparate appliances as mobile telephones, TV set top boxes, pagers, coffee makers, toasters, in-car systems, vehicle management control systems and personal digital assistants (PDAs), to name but a few. The market for embedded processing devices is growing extremely fast, in particular new applications and hardware architectures are appearing on an almost daily basis.

With regard to applications, multi-media applications are now necessary for wireless devices, set-top boxes or screen telephones, amongst other things. Moreover, wireless products have introduced a need for new kinds of applications such as new communication protocols (UMTS), ad hoc networks or neighborhood interaction protocols based on blue tooth technology, for example. Other applications will be readily recognized by the ordinarily skilled person.

Furthermore, hardware architectures for embedded processing devices are constantly being developed since there is an increasing need for computation capacity, as well as other requirements such as safety-critical systems, autonomy management and power saving features.

Another feature of embedded devices is that they are often one of a plurality of processing devices which form an embedded processing system. Such embedded systems are useful for complex applications such as multi-media applications.

In order to aid application development, and to re-use applications to run on different host processors, it is desirable that the application code is transportable between different host processors. This provides for re-use of whole applications, or parts thereof, thereby increasing the speed of development of applications for new processors and indeed increasing the speed of development of new applications themselves. This may be achieved by means of program code which runs on a host processor and is capable of translating high level program code into operation code or instructions for the host processor. The program code provides a virtual machine for a host processor, enabling it to implement application software written in an appropriate high level language. An example of such translating program code is the JAVA programming language developed by Sun Microsystems, Inc. (JAVA is a trademark of Sun Microsystems, Inc). Such program code, when running on an appropriate host processor is known as a JAVA Virtual Machine.

Although examples of embodiments of the present invention will be described with reference to JAVA and JAVA Virtual Machines, embodiments in accordance with the invention are not limited to the JAVA programming language but may be implemented using other suitable programming languages for forming virtual machines.

A feature of a virtual machine is that it provides for the dynamic loading of applications onto embedded processing systems. This is an extremely useful feature. Typically, applications are already embedded within a processing system. It is difficult to dynamically download an application or to patch an existing application onto an embedded processing device. However, virtual machines, such as JAVA, provide the possibility of enabling dynamic loading of a complete application that could be written by a third party and available on a remote server, for example. Moreover, distribution and maintenance costs are reduced since it is possible to dynamically interact with the embedded system via the virtual machine. Due to JAVA application program interface (API) standardization, the compatibility of applications can be ensured if the JAVA platform on the embedded system is compliant with the standardization.

Security features are also available within JAVA to identify a trusted code which is dynamically downloaded through a network and to preserve the availability of the embedded system.

Another feature of JAVA is that the hardware architecture heterogeneity management may be masked. A major advantage of such a feature is that it reduces the software development costs of an application. Embedded processors typically are highly diverse and have specific capabilities and capacities directed to the needs of the system or appliance in which they are embedded. This would generally give rise to a high cost of application development. However, because of the portable nature of JAVA code between JAVA Virtual Machines, the cost of integrating a new hardware architecture, for example, merely relies on developing a new JAVA Virtual Machine. Another important feature is that the transparent exploitation of a multi-processor architecture can be achieved by a JAVA Virtual Machine, without any change of the application code when the virtual machine embodied on multiprocessor system. In this case, the JVM is able to distribute and manage application code chunks executed on different processors.

As reported in "Microprocessor Report," February 2001, Sun offers the Java solution in three formats: the Version 2 standard edition (J2SE), an enterprise edition (J2EE), and the new Java-2 MicroEdition (J2ME), with the third being most appropriate for embedded applications. As a result of J2ME, embedded applications incorporating Java are starting to proliferate.

J2ME is a Sun Java platform for small embedded devices. KVM is the JAVA virtual machine of J2ME. It supports 16 and 32 bits CISC and RISC processors, and generates a small memory footprint and can keep the code in a memory area of about 128 KB. It is written for a ANSI C compiler with the size of basic types well defined (e.g. character on 8 bits, long on 32 bits). Additionally, an optional data alignment can only be obtained for 64 bit data. Other alignments are handled by the C compiler.

Regardless of the Java environment's format, a compiled Java program (in byte-codes) is distributed as a set of class files and is generally run through an interpreter (the JVM) on the client. The JVM converts the application's byte-codes into machine-level code appropriate for the hardware. The JVM also handles platform-specific calls that relate to the file system, the graphical user interface (GUI), networking calls, memory management that includes garbage collection, exception handling, dynamic linking and class loading, run-time checks, the management of multiple threads of program execution, and support for Java's secure environment for running application software.

Java processing solutions differ by the boundary between JVM hardware and software functions. For example, the traditional approach, even for embedded applications, is to implement the entire JVM in software. At the other extreme is the relatively unpopular approach of performing all but the most complex JVM functions in hardware, using dedicated Java processors with new instruction sets or Java-only instruction sets (examples include aJile's aJ-100, the Imsys Cjip, picoJava, PTSC ROSC, and Vulcan's Moon). The phrase "unpopular approach" does not imply an inferior product but is more specifically related to acceptance of these processors. The Java accelerators, ranging from extensions to the embedded processor's decoding hardware to standalone coprocessors that run in parallel with a host CPU, lie functionally between the software-only approach and the dedicated hardware approach.

Regardless of the system implementation, parts of the JVM will likely always run on the host CPU. In other words, the accelerators will leave some of the more complex, and perhaps infrequently used, Java byte-codes to be implemented as function calls on the host CPU. But the biggest performance impact is translation of the platform-independent byte-codes into the host's native binary code.

In a software-only environment, translating the byte-codes is tedious and involves some form of lookup to determine the native instructions. This translation is also available in the form of just-in-time (JIT) compilers that consume at least 100 KB of system memory—not to mention the added time consumed when a Java application is launched. Furthermore, since Java is a stack-oriented language, simple byte-code operations transform into a more complex code stream to implement the proper functions on the host CPU. For example: an expression such as C=A+B becomes "push A, push B, add, pop C," compared with "load A to R1, load B to R2, add R2 and R1; store R1 to C." On a high-performance desktop PC or "beefy" embedded system, this Java execution inefficiency is a moot point. On embedded applications, such as wireless handsets, pagers, PDAs, and small "point-of-purchase" terminals, performance and power consumption are closely monitored by system designers.

Many vendors put significant energy into optimizing the performance of the pure software JVM. Many of these optimizations use assembly language to improve the native code sequences translated from the Java byte-codes as well as to improve the interpreter loop itself. Although doing this typically yields a 2.0–2.5 times improvement, it isn't enough to meet the performance requirements for upcoming applications. Motorola uses this method in its first-generation, Java featured iDEN phone, due out in the U.S. during 1Q01. This method is also implemented by many companies that offer products with Java features, embedded or not. The phone contains an M-Core-based processor that executes the entire JVM in software, consuming 426 KB of M-Core code and 96 KB of RAM. NTT DoCoMo, the first company in Japan to have Java-featured phones, has also implemented this method of Java support.

Moving away from the pure software approach, several companies, including ARM, Chicory Systems, inSilicon, and Nazomi (originally known as JEDI Technologies), are making a variety of hardware accelerators available. These vendors claim that their accelerators produce an average five to ten times increase over the speed of the software method running the synthetic CaffeineMark benchmark. Realistically, the actual speedup is highly dependent on the application.

From a software perspective, the simplest approach is a Java hardware interpreter requiring only minor modifications to the JVM. On the other hand, the interpreter poses the biggest hardware challenges, because it is tightly coupled to the processor core. First announced by Nazomi, and followed by a similar design from ARM, the hardware interpreter is essentially an on-the-fly interpretation engine that generates native code from byte-codes.

Thus, in general, but for embedded systems in particular, techniques for improving the performance of a software based JVM are needed.

SUMMARY OF THE INVENTION

The present invention adds significant performance, energy and memory size gains to current JAVA acceleration techniques, particularly in portable multimedia applications where signal processing is extensively used. In addition to the performance improvements obtained with known byte-code per byte-code acceleration techniques, the present invention uses a combination of HW and SW to accelerate execution of multiple byte-code sequences, providing a further step in system performance improvement.

One embodiment of the invention is a method for operating a digital system, wherein the digital system has a processor with a virtual machine environment for interpretively executing instructions. First, a sequence of instructions is received for execution by the virtual machine. The sequence of instructions is examined to determine if a certain type of iterative sequence is present. If the certain type of iterative sequence is present, the iterative sequence is replaced with a proprietary code sequence. After the modifications are complete, the modified sequence is executed in a such manner that a portion of the sequence of instructions is executed in an interpretive manner, and the proprietary code sequences are executed directly by acceleration circuitry.

In a first embodiment, an iterative loop is identified by direct inferential inspection of the byte-code sequence.

In another embodiment, an iterative loop is identified by comparing a set of templates to the sequence of instructions to determine if the certain type of iterative sequence is present, wherein the set of templates are representative of the certain type of iterative sequence.

BRIEF DESCRIPTION OF THE DRAWINGS

Particular embodiments in accordance with the invention will now be described by way of example only, and with reference to the accompanying drawings in which like reference signs are used to denote like parts and in which:

FIG. 1 illustrates the process flow for implementing an application using a JAVA Virtual Machine;

FIG. 2 is a representation of JAVA byte-code, illustrating replacement of an iterative loop with a proprietary code sequence;

Corresponding numerals and symbols in the different figures and tables refer to corresponding parts unless otherwise indicated.

DETAILED DESCRIPTION OF EMBODIMENTS OF THE INVENTION

Figure 3:
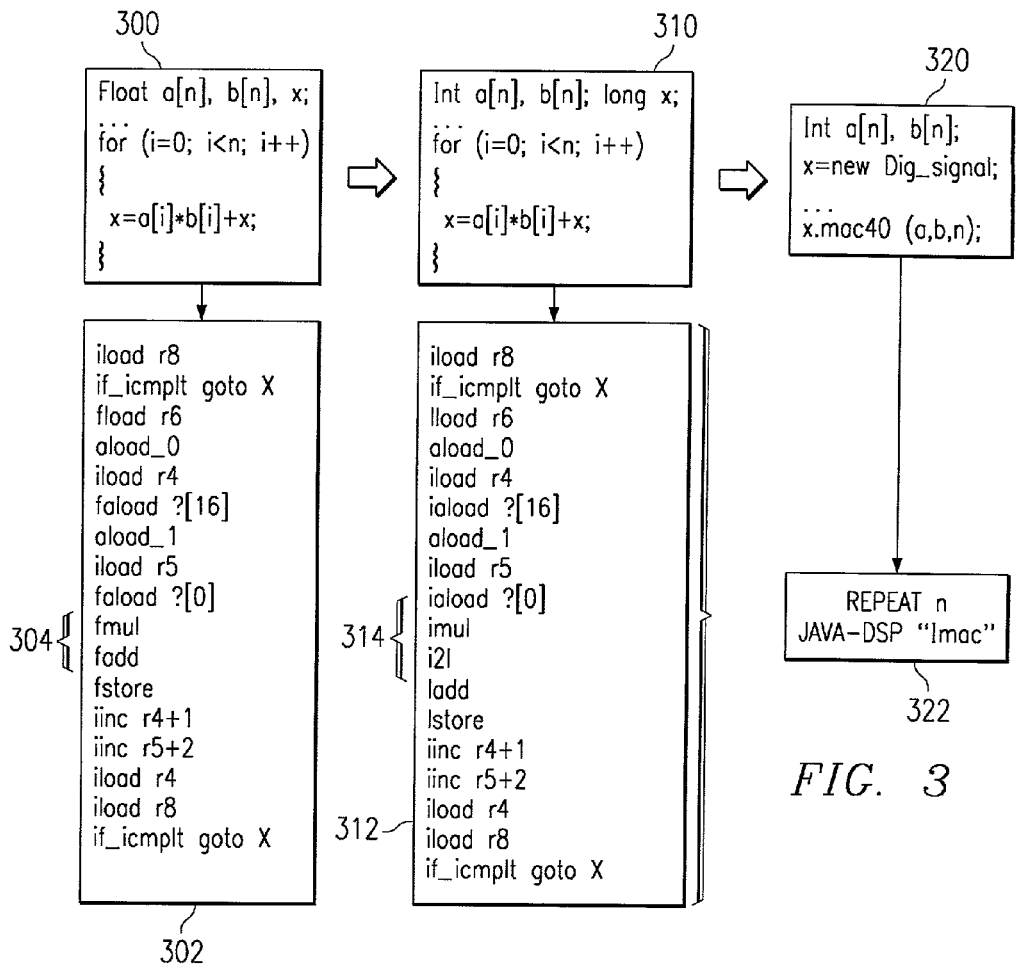
FIG. 3 is a representation of JAVA byte-code, illustrating use of simpler integer arithmetic in place of floating point arithmetic in order to improve execution performance.

The present invention uses a combination of HW and SW to accelerate execution of multiple byte-codes sequences, providing a further step in system performance improvement. For instance, several JAVA applications, particularly in multimedia environments, implement signal processing code that uses easily identifiable sequences such as data arrays accesses and multiply-accumulate-store operations.

Provided that the JAVA Virtual Machine (JVM) on a JAVA appliance can use suitable signal processing HW resources, such as multiply-accumulate (MAC) unit and/or address generation units, any byte-code sequence that performs signal processing that is downloaded from a server on this JAVA appliance would benefit from the run-time optimization scheme described below.

Once the byte-code is loaded in the appliance, prior to execution, the JVM loads the different classes constituting the application byte-code and verifies this byte-code. In the present embodiment of the invention, this latter step is completed by sequence recognition and proprietary JAVA-DSP byte-code substitution in the classes. Then, the classes containing the original byte-codes can be removed from appliance memory, while the modified classes are retained. As a result of this, not only significant performance and energy gain are achieved, but also significant memory size compression is provided.

FIG. 1 illustrates a process flow for implementing an application using a JAVA Virtual Machine. The process starts at step 120 where an application in JAVA source code is developed and written. That application source code is compiled in a JAVA compiler at step 122 which converts the application source code into an architecture neutral object file format thereby forming a compiled instruction sequence at step 124, in accordance with the JAVA Virtual Machine specification. The compiled instruction sequence at step 124 consists of a plurality of byte-codes. The byte-codes are then received by a JAVA appliance and executed by a JAVA Virtual Machine that is contained within the JAVA appliance at step 126. A byte-code sequence can be received by an appliance in a number of ways as is well known, such as by being explicitly loaded during manufacture of the appliance, by being downloaded over a wire or wireless connection from a server, etc. The JVM translates the byte-codes into processor instructions for implementation by the embedded processor located within an appliance at step 128, such as processor 104 of FIG. 5. The JVM also modifies certain sequences of the byte-code by replacing the selected sequence with a proprietary construct that is executed by acceleration circuitry connected to the processor in order to accelerate execution of application program. These last two steps will now be described in more detail.

FIG. 2 is a representation of JAVA byte-code, illustrating replacement of an iterative byte-code loop with a proprietary code sequence. The code represented by sequence 200 is a sequence of byte-code instructions that have been received by the appliance for execution by the JVM on the appliance. The numbers n-1, n, etc represent the instruction address; however, in this illustration no attempt is made to account for instruction lengths that are greater than one byte. In one form of optimization, during the verify process a two instruction sequence 202 comprising instructions at address n+m and n+m+1 is recognized to be a floating point multiply instruction (fmul) followed by a floating point add instruction (fadd). If the JVM has access to a floating point MAC unit, then these two instructions are replaced by a proprietary DSP floating-point instruction (DSP-fmac) in modified sequence 210. The operation of floating point MAC units is known and need not be described in detail herein.

Thus, modified byte-code sequence 210 contains one less instruction since two byte-code instructions have been replaced by one proprietary instruction. Furthermore, the proprietary DSP-fmac instruction will be executed on a specialized MAC unit in a faster manner than if the JVM interpreted each byte-code that was replaced.

In this embodiment of the invention, a repeat(n) instruction is provided. A repeat(n) instruction causes the following instruction to be executed "n" times without the need to refetch the instruction. The operation of a repeat instruction is known and need not be described in detail herein. For example, U.S. Pat. No. 4,713,749 entitled "Microprocessor with Repeat Instruction" describes such an instruction as well as a MAC unit. Another embodiment may provide a repeat instruction that operates on a block of instructions.

Referring again to FIG. 2, an aspect of the present invention is that a further determination is made that the instructions in the sequence comprising address n through n+m+z also form an iterative loop, as indicated at 212. The byte code instructions immediately before and after the DSP-fmac instruction are all involved in calculating array addressing for the operands of the fmac instruction and also in calculating a loop index value to control the iterative loop. Therefore, the entire sequence indicated at 214 can be replaced with the repeat(n) construct 222 in modified sequence 220. In this case, code space is significantly reduced since only two instructions replace the entire loop, and execution performance is significantly improved since only two instructions are fetched once during execution of the entire loop.

FIG. 3 is a representation of JAVA byte-code, illustrating use of simpler integer arithmetic in place of floating point arithmetic in order to improve execution performance. Further performance steps can be achieved if the JAVA programmer follows some recommendations regarding data types usage, for instance: using arrays of integers indexed within "for" loops, or usage of specific DSP classes. FIG. 3 illustrates how to avoid usage of expensive floating-point arithmetic's to form a 40-bit result MAC operation with suitable JAVA-DSP hardware, for instance. Box 300 represents JAVA source code that uses floating point arithmetic while box 302 illustrates the resultant compiled JAVA byte-code. Note the resultant floating point multiply and add sequence 304.

Box 310 represent JAVA source code that uses integer arithmetic with a "long" 40 bit result x, while box 312 illustrates the resultant compiled JAVA byte-code. Note the resultant integer multiply and add sequence 304 that includes an integer-to-long conversion instruction "i2l" in sequence 314. Advantageously, sequence 314 can be replaced with a single JAVA DSP integer multiply-accumulate instruction "imac."

Box 320 represents use of a DSP class in which the JAVA source contains a proprietary instruction x.mac40(a,b,n). The resultant proprietary byte-code is illustrated in box 322 and comprises merely a repeat(n) instruction and an imac instruction that is repeated a number of times in response to the repeat(n) instruction.

Advantageously, the same result can be reached by determining that the code sequence represented box 312 is an iterative loop that includes array addressing for the operands. This entire byte-code sequence can be replaced in the appliance during byte-code verification by the JVM prior to execution with the simple repeat(n) construct 322.

Figure 4:
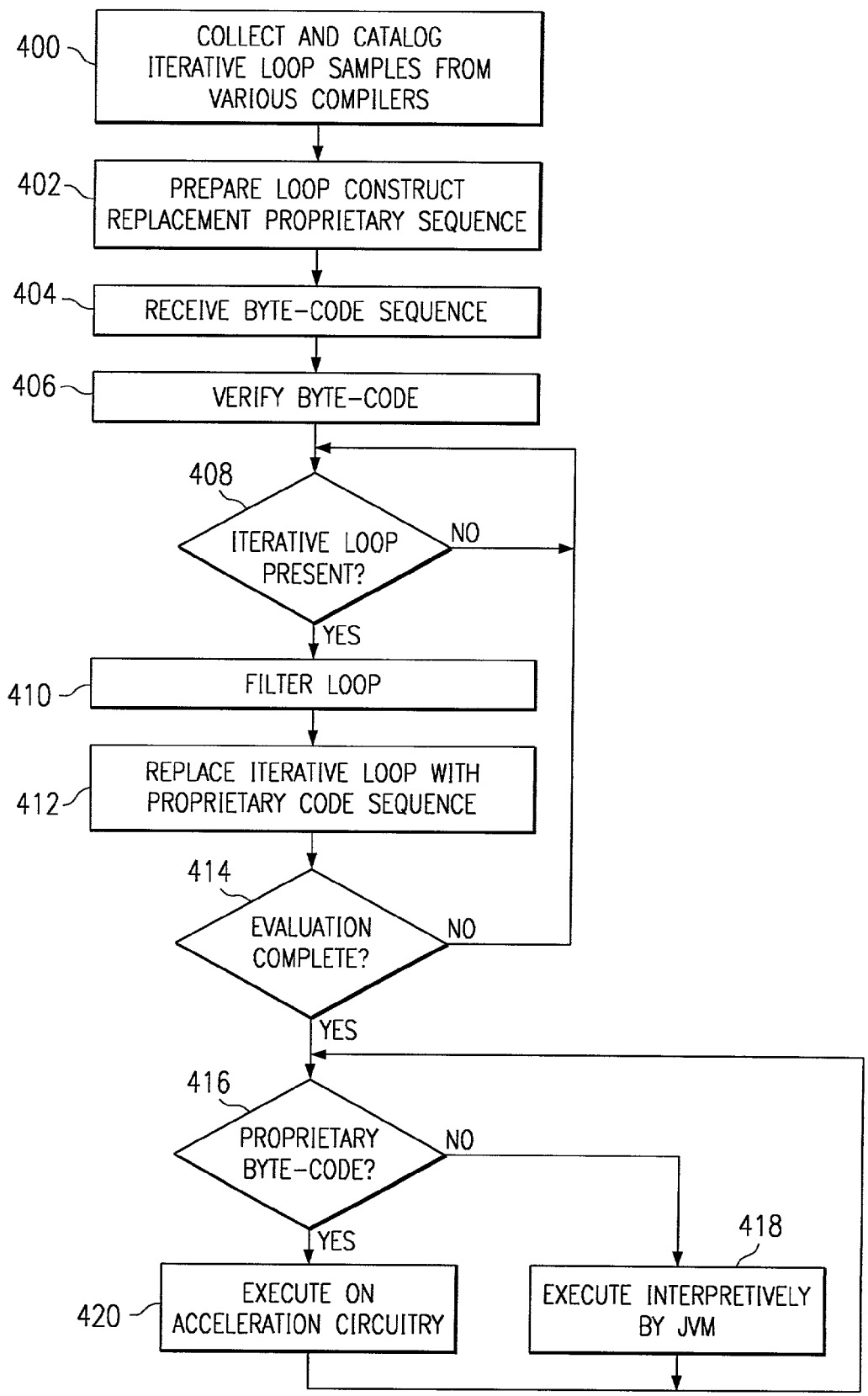
FIG. 4 is a flow chart illustrating a process for determining if an iterative loop is present in a byte-code sequence such as in FIG. 2 and replacement of the loop with a proprietary loop construct.

FIG. 4 is a flow chart illustrating a process for determining if an iterative loop is present in a byte-code sequence such as in FIG. 2 and replacement of the loop with a proprietary loop construct. In step 400, various iterative loop samples are collected from various compilers and cataloged to form a set of loop templates that can then be compared against byte-code sequences that are received for execution. For a given source code loop construct, a compiler will generally produce the same output. Therefore, by examining an instruction sequence produced by the compiler the loop construct can be inferred. By forming a set of loop templates collected from various compilers, iterative loop constructs of various types can be identified during an evaluation of a byte-code sequence as will be described below.

In step 402, a set of proprietary code sequences is prepared and matched to the templates obtained in step 400. In this manner, a proprietary code sequence can be fashioned for a JAVA appliance that correctly performs each of the loop constructs represented by the set of loop templates in accordance with whatever accelerator resources are available on the appliance. The set of loop templates and corresponding proprietary code sequences is then included with the JVM on the JAVA appliance.

In step 404, a byte-code sequence is received by the JAVA appliance for execution. As discussed previously, the sequence is first verified in step 406. Then in step 408 the sequence is scanned and compared to the set of loop templates from step 400. This comparison may be done in a strict manner or in a loose manner. For a strict comparison, if there are any byte-codes in the sequence that do not match the template, then no match is declared. However, a looser comparison can also be done in which byte-codes within a sequence that otherwise matches the template are filtered out and saved, as indicated in step 410. These byte-codes are then included with the proprietary code sequence when the loop sequence is replaced with a corresponding proprietary code sequence in step 412.

The received byte-code sequence is thus evaluated by sequentially scanning the sequence and iterative loop sequences are replaced with proprietary code sequences until the end of the byte-code sequence is reached in step 414. The result of this process is the formation of a modified byte-code sequence. Although the sequence recognition phase adds complexity to the JVM, this step is performed once before execution, and does not impact intrinsic run-time JVM performance.

Once the evaluation is complete, execution commences with step 416. Each byte-code in the modified byte-code sequence is evaluated on the fly. If it is a standard JVM compliant byte-code, then it is executed interpretively by the JVM in step 418. However, if the byte-code is a proprietary code, then it is executed on acceleration circuitry included within the JAVA appliance in step 420.

Thus, advantageously, performance can be improved and code size reduced by replacing certain iterative loop sequences with corresponding proprietary code sequences. Advantageously, if an additional function is performed within the loop that is not supported by the acceleration circuitry, the byte-codes that perform this function can filtered out of the sequence that is being replaced and then included with the proprietary code sequence. In this manner, the non-supported function will then by interpreted by the JVM.

In another embodiment of the invention, an iterative loop sequence is determined by direct inferential inspection of the byte-code sequence using a set of rules. For example, an iterative loop generally has a loop index; therefore whenever a sequence of byte-codes is identified that implements an index function in conjunction with a branch to an earlier part of the sequence, then it can be inferred that the loop is iterative.

Furthermore, if a specific sequence such as fmul and fadd are found, then it can be inferred that a MAC function is being performed if the operands are related. If the MAC function is within an iterative loop, then it can be inferred that this is an iterative MAC loop.

Iterative MAC loops often use indexed arrays for the operands. Thus, if a sequence of byte-codes that generate indexed addresses for the operands of the MAC can be identified, and if the same index is used for the loop index, then this entire structure can be replaced with a proprietary "repeat(n), mac(a+,b+,n)" sequence where the mac(a+,b+,n) instruction perform auto-increment for operands a and b.

For example, Table 1 contains sample JAVA source code for a finite impulse response (FIR) filter that is a typical DSP operation. Lines 12–17 describe an iterative loop. In line 13, the output parameter is initialized to zero. In line 14, the for-loop index (incr) is defined to go from a value of zero to ten. In line 16, a multiply-accumulate function is defined that uses the loop index (incr) also to access the coefficient (coeff) array operand and the input array operand.

TABLE 1

Source Code for FIR Example

```
1    public class FIR{
2        static short[ ] coeff__Fir = { 11 , . . . , -2, -3,7};
3        static short[ ] coeff__Input = { 11 , 15, . . . ,7};
4        static long[ ] coeff__out = new long[20];
5    public static void main(String[ ] args){
6        FIR MonFir = new FIR( );
7        for (short outIncr =0: outIncr < 20; outIncr++)
8            coeff__out[outIncr] =
                 MonFir.computeFir(coeff__Input,outIncr);
9        for (short outIncr2 =0: outIncr2 < 20; outIncr2++)
10           System.out.println(coeff__out[outIncr2]);
11   }
12   long computeFir (short[ ] input, short outIncr){
13       long output = 0;
14       for ( short incr = 0; incr < 10; incr++)
15       {
16           output += coeff__Fir[incr] * input[outIncr+incr] ;
17       }
18       return output;
19   }
```

Table 2 is the byte-code sequence produced for the source code of Table 1 using a JAVA compiler, such as a compiler available from Sun Microsystems, version JDK 1.1.8. During evaluation step 408 of FIG. 4, this code evaluated in a sequential manner. The code sequence "imul (integer multiply), i21 (integer to long conversion), and ladd (long add)" at lines 21, 22, and 23 are recognized as a MAC function. At line 36 the conditional negative branch to line 8 is recognized as forming an iterative loop around the MAC function. It is inferred from lines 32, 34, 36 that register 5 holds a loop index for the iterative loop. Furthermore, it is inferred from lines 25–30 that an address index is calculated using the same loop index value that is stored in register 5. Further direct inspection determines that lines 9–20 perform operand accessing using the indexed address based on the loop index variable. Therefore, by this direct inspection, it can be determined that this entire iterative loop construct comprising lines 8–36 can be replaced by a simple "repeat(n), imac(S1+, S2+, D)" sequence, where S1 and S2 are the first and second indexed operands and D is the result variable.

found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

TABLE 2

Byte-Code for FIR Example

Method long computeFir(short[ ], short)
| | | |
|---|---|---|
| 0 | lconst_0 | : initialize result variable |
| 1 | lstore_3 | |
| 2 | iconst_0 | : initialize loop index |
| 3 | istore 5 | |
| 5 | goto 32 | : start loop execution at location 32 |
| 8 | lload_3 | : load result variable |
| 9 | getstatic #7 <Field short coeff_Fir> | : access second operand using indexed address |
| 12 | iload 5 | |
| 14 | saload | |
| 15 | aload_1 | : access first operand using indexed address |
| 16 | iload_2 | |
| 17 | iload 5 | |
| 19 | iadd | |
| 20 | saload | |
| 21 | imul | : multiple first and second operands |
| 22 | i2l | : convert result to long |
| 23 | ladd | : accumulate to output variable |
| 24 | lstore_3 | : save result variable |
| 25 | iload 5 | : calculate indexed address for second operand |
| 27 | iconst_1 | |
| 28 | iadd | |
| 29 | i2s | |
| 30 | istore 5 | |
| 32 | iload 5 | : retrieve loop index |
| 34 | bipush 10 | : push loop count value |
| 36 | if_icmplt 8 | : compare loop index to loop count, iterate to location 8 if not complete |
| 39 | lload_3 | : load completed result variable |
| 40 | lreturn | |

Once all of the byte-codes within the iterative loop that are involved with the MAC function have been identified, as described above, then if there are any remaining byte-codes these are filtered out in step 410 and then included in the "repeat(n)" construct in step 412 so that their function is preserved.

In a similar manner, iterative loops which contain other types of functions that are amenable to acceleration circuitry can be identified, such as floating point arithmetic, movement of blocks of data, etc.

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 5:
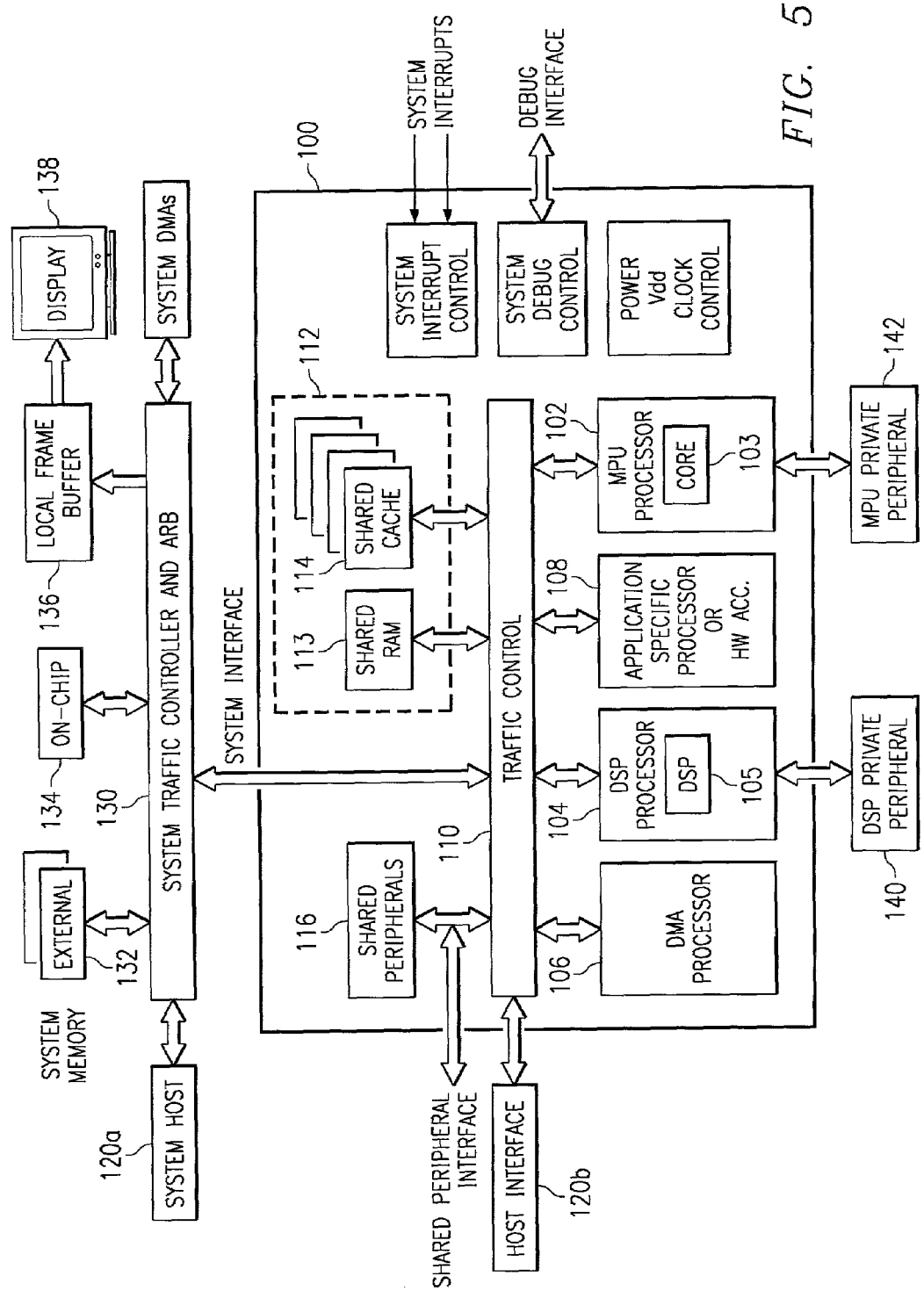
FIG. 5 is a block diagram of a digital system that includes an embodiment of the present invention in a megacell core having multiple processor cores.

FIG. 5 is a block diagram of a digital system that includes an embodiment of the present invention in a megacell core 100 having multiple processor cores. Multi-processor system 100 illustrates an embodiment of a multi-processor system suitable for providing a platform for a virtual machine in accordance with an embodiment of the present invention. In the interest of clarity, FIG. 1 only shows those portions of megacell 100 that are relevant to an understanding of an embodiment of the present invention. Details of general construction for DSPs are well known, and may be Referring again to FIG. 5, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. DSP 104 includes a MAC unit that can be used to execute a proprietary mac instruction code. A traffic control block 110 receives transfer requests from a memory access node in a host processor 120, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. Host processor 120 interacts with the resources on the megacell via system traffic controller 130. A host interface connected to traffic controller 130 allows access by host 120 to megacell 100 internal and external memories. A set of private peripherals 140 are connected to the DSP, while another set of private peripherals 142 are connected to the MPU.

Each processor defines its own data representation capabilities, for example from 8 bits to 128 bits and possibly more in future processing devices. For efficient operation, a JAVA Virtual Machine must be capable of manipulating byte-codes that are adapted for the particular data representation of the target processor. The availability of a 32-bit floating point hardware accelerator 108 can also be utilized by JAVA Virtual Machine to implement the float or double JAVA data types. Additionally, the registers available in processors 103 and 105 may be exploited, or at least a sub-set of them, to optimize JAVA stack performance. For example, one register can be used for the representation of the JAVA stack pointer.

For mobile or portable applications, an important aspect of the processor system is the use by the JAVA Virtual Machine of energy aware instruction sets such that the byte-code generated for the JAVA Virtual Machine minimize the system energy consumption.

In an alternative embodiment, a MAC unit may be coupled to and controlled by a general purpose processor, such as control processor 102. In this case, a proprietary mac instruction would be handled by processor 102 and sent to the connected MAC unit for execution.

Digital System Embodiment

Figure 6:
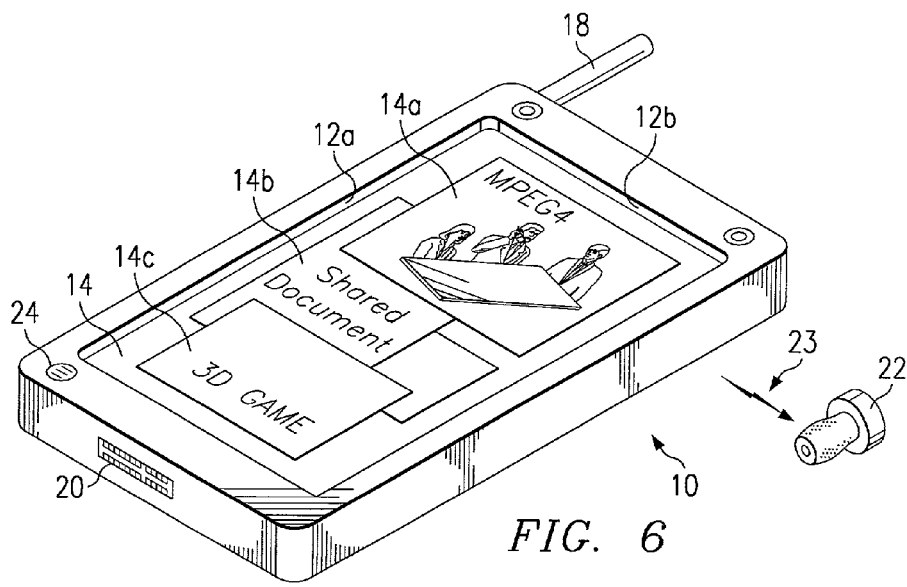
FIG. 6 is a representation of a telecommunications device incorporating an embodiment of the present invention.

FIG. 6 illustrates an exemplary implementation of an example of such an integrated circuit in a mobile telecommunications device, such as a mobile personal digital assistant (PDA) 10 with display 14 and integrated input sensors 12a, 12b located in the periphery of display 14. As shown in FIG. 6, digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to earpiece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless ear piece 22.

Megacell 100 provides all encoding and decoding for audio and video/graphical information being sent and received via the wireless network link and/or the wire-based network link.

It is contemplated, of course, that many other types of communications systems and computer systems may also benefit from the present invention, particularly those relying on battery power. Examples of such other computer systems include portable computers, smart phones, web phones, and the like. As power dissipation and processing performance is also of concern in desktop and line-powered computer systems and micro-controller applications particularly from a reliability standpoint, it is also contemplated that the present invention may also provide benefits to such line-powered systems.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false. References to storing or retrieving data in the cache refer to both data and/or to instructions.

While the invention has been described with reference to illustrative embodiments, this description is not intended to be construed in a limiting sense. Various other embodiments of the invention will be apparent to persons skilled in the art upon reference to this description. For example, the invention is applicable to other types of interpretive languages, such a P-code, for example.

It is therefore contemplated that the appended claims will cover any such modifications of the embodiments as fall within the true scope and spirit of the invention.

What is claimed is:

1. A method for operating a digital system, wherein the digital system has a processor with a virtual machine environment for interpretively executing instructions, the method comprising the steps of:
   a) receiving a sequence of instructions for execution by the virtual machine;
   b) determining if any of a set of predetermined iterative sequences is present by examining the sequence of instructions;
   c) if any of the predetermined iterative sequences is present, replacing each predetermined iterative sequence with a corresponding proprietary code sequence;
   d) executing instructions in the sequence of instructions but not present in any predetermined iterative sequence interpretively; and
   e) executing instructions present in any predetermined iterative sequence by executing the corresponding proprietary code sequence directly by acceleration circuitry.

2. The method of claim 1, wherein step b further comprises the steps of:
   determining that a function performed by a portion of the iterative sequence of instructions can be performed directly by the acceleration circuitry; and
   determining that a loop index is used to direct iterative execution of the portion of the sequence of instructions to form the iterative sequence.

3. The method of claim 2, wherein step b further comprises the step of determining that the iterative sequence performs array addressing by using the loop index to perform address calculations.

4. The method of claim 1, wherein step b comprises comparing a set of templates to the sequence of instructions to determine if any of the predetermined iterative sequences is present, wherein the set of templates are representative of the set of predetermined iterative sequence.

5. The method of claim 1, wherein the proprietary code sequence replacing each predetermined iterative sequence comprises a repeat instruction and a functional instruction, such that during step e the functional instruction is fetched only once but executed repeatedly a number of times in response to the repeat instruction.

6. A digital system comprising:
   a processor connected to a memory for holding instructions, with a virtual machine environment stored in the memory;
   acceleration circuitry connected to the processor; and
   wherein the processor is operable to execute a sequence of instructions using the virtual machine environment by
   a) receiving a sequence of instructions for execution by the virtual machine;
   b) determining if any of a set of predetermined iterative sequences is present by examining the sequence of instructions;
   c) if any of the predetermined iterative sequences is present, replacing each predetermined iterative sequence with a corresponding proprietary code sequence;
   d) executing instructions in the sequence of instructions but not present in any predetermined iterative sequence interpretively; and
   e) executing instructions present in any predetermined iterative sequence by executing the corresponding proprietary code sequence directly by acceleration circuitry.

7. The digital system of claim 6, wherein the processor further is operable to execute a sequence of instructions using the virtual machine environment by:
   determining that a function performed by a portion of the iterative sequence of instructions can be performed directly by the acceleration circuitry; and
   determining that a loop index is used to direct iterative execution of the portion of the sequence of instructions to form the iterative sequence.

8. The digital system of claim 7, wherein the processor further is operable to execute a sequence of instructions using the virtual machine environment by determining that the iterative sequence performs array addressing by using the loop index to perform address calculations.

9. The digital system of claim 6, wherein the processor further is operable to execute a sequence of instructions using the virtual machine environment by comparing a set of templates to the sequence of instructions to determine if any of the predetermined iterative sequences is present, wherein the set of templates are representative of the set of predetermined iterative sequence.

10. The digital system of claim 6, wherein the processor further is operable to execute a sequence of instructions using the virtual machine environment by replacing each predetermined iterative sequence with a repeat instruction and a functional instruction, such that during step e the functional instruction is fetched only once but executed repeatedly a number of times in response to the repeat instruction.

* * * * *